US009152640B2

(12) United States Patent
Tan et al.

(10) Patent No.: US 9,152,640 B2
(45) Date of Patent: Oct. 6, 2015

(54) DETERMINING FILE ALLOCATION BASED ON FILE OPERATIONS

(75) Inventors: Yu Shyang Tan, Singapore (SG); Kok Leong Ryan Ko, Singapore (SG); Peter Jagadpramana, Singapore (SG); Bu Sung Lee, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/468,823

(22) Filed: May 10, 2012

(65) Prior Publication Data

US 2013/0304774 A1  Nov. 14, 2013

(51) Int. Cl.
*G06F 17/30* (2006.01)
*H04L 29/08* (2006.01)

(52) U.S. Cl.
CPC ...... *G06F 17/30082* (2013.01); *H04L 67/1097* (2013.01); *H04L 67/101* (2013.01)

(58) Field of Classification Search
CPC ................ G06F 17/30067; G06F 17/30194; G06F 2206/1012; G06F 17/30082; H04L 67/101; H04L 67/1097
USPC ........................................................ 707/827
See application file for complete search history.

(56) References Cited

U.S. PATENT DOCUMENTS

| | | | | |
|---|---|---|---|---|
| 6,477,548 B1 * | 11/2002 | Nihei | ................................. | 1/1 |
| 6,965,569 B1 * | 11/2005 | Carolan et al. | ................. | 370/238 |
| 7,277,946 B2 * | 10/2007 | Humphrey et al. | ........... | 709/226 |
| 7,991,747 B1 * | 8/2011 | Upadhyay et al. | ............ | 707/674 |
| 8,024,463 B2 | 9/2011 | Hanson et al. | | |
| 8,266,290 B2 * | 9/2012 | Calder et al. | ................... | 709/226 |
| 8,352,608 B1 * | 1/2013 | Keagy et al. | ................... | 709/226 |
| 8,443,077 B1 * | 5/2013 | Lappas et al. | ................. | 709/224 |
| 8,468,120 B2 * | 6/2013 | Gupta et al. | ................... | 707/602 |
| 8,560,375 B2 * | 10/2013 | Glenning | ..................... | 705/7.36 |
| 8,572,244 B2 * | 10/2013 | Campagnoni | ................. | 709/224 |
| 2002/0138559 A1 * | 9/2002 | Ulrich et al. | ................... | 709/203 |
| 2003/0018929 A1 | 1/2003 | Bardsley et al. | | |
| 2006/0184937 A1 | 8/2006 | Abels et al. | | |
| 2006/0195721 A1 | 8/2006 | Moyer et al. | | |
| 2007/0011492 A1 | 1/2007 | Swaine | | |
| 2007/0214183 A1 * | 9/2007 | Howe et al. | ................... | 707/200 |
| 2008/0244535 A1 | 10/2008 | Nelson et al. | | |
| 2009/0248693 A1 | 10/2009 | Sagar et al. | | |
| 2010/0026643 A1 | 2/2010 | Ozawa et al. | | |
| 2010/0115614 A1 | 5/2010 | Barile et al. | | |
| 2010/0220622 A1 | 9/2010 | Wei | | |
| 2010/0325339 A1 * | 12/2010 | Ogawa et al. | ................. | 711/103 |
| 2011/0022812 A1 * | 1/2011 | van der Linden et al. | .... | 711/163 |

(Continued)

FOREIGN PATENT DOCUMENTS

CN              102117334           7/2011

OTHER PUBLICATIONS

Mahmood et al., Adaptive File Allocation in Distributed Computer Systems, Nov. 2, 1993, pp. 354-361.*

(Continued)

*Primary Examiner* — Jorge A Casanova
(74) *Attorney, Agent, or Firm* — Hewlett-Packard Patent Department

(57) ABSTRACT

A storage system may store files on multiple nodes. One or more logs may indicate operations performed on the files stored in the storage system and may identify the nodes that requested the operations. A new allocation or file placement scheme may be determined to reduce network traffic.

17 Claims, 6 Drawing Sheets

(56) References Cited

U.S. PATENT DOCUMENTS

2011/0119328 A1*  5/2011  Simitci et al. ................. 709/203
2011/0145836 A1*  6/2011  Wheeler et al. ............... 719/314
2011/0307573 A1* 12/2011  Lingafelt et al. .............. 709/217
2012/0204187 A1*  8/2012  Breiter et al. ................. 718/105

OTHER PUBLICATIONS

Druschel, P. et al, "Past: A Large-scale, Persistent Peer-to-Peer Storage Utility".
Patent Application S/N PCT/US2011/043679, filed Jul. 12, 2011.
Dunlap, G., et al., ReVirt: Enabling Intrusion Analysis through Virtual-Machine Logging and Replay, USENIX Association, 5th Symposium on Operating Systems Design and Implementation, 2002, pp. 211-224.
Hai Jin et al., A VMM-Based Intrusion Prevention System in Cloud Computing Environment, Apr. 21, 2011, Springer-Science+Business Media, LLC, J. Supercomput (2013) vol. 66, pp. 1133-1151.
International Search Report and Written Opinion, Feb. 21, 2012, PCT Patent Application No. PCT/US2011/043679, 9 pages.
Oikawa, S., et al., Simultaneous Logging and Replay for Recording Evidences of System Failures, SEUS 2010, LNCS 6399, 2010, IFIP International Federation for Information Processing 2010, pp. 143-154.

* cited by examiner

DETERMINING FILE ALLOCATION BASED ON FILE OPERATIONS

BACKGROUND

Cloud computing has increased in popularity as more applications and data services are being managed remotely on a server rather than locally on a client. For example, cloud systems are often used to store files and host applications for users. A cloud system may include many servers to perform these storage and hosting functions. Each server in a cloud system can be referred to as a node. Users can connect to the cloud system via the Internet (such as for a public cloud) or some other network (such as for a private cloud) using their own computing devices, such as personal computers, smart phones, or the like.

BRIEF DESCRIPTION OF DRAWINGS

The following detailed description refers to the drawings, wherein.

DETAILED DESCRIPTION

A cloud system may store files in a file storage network spread over one or more nodes in the cloud system. Processes running on nodes in the cloud system may request that various operations be performed on the stored files, such as accesses, modifications, and the like. The processes may be one or more virtual machines running on one or more nodes of the cloud system. The files may also be operated on at the request of other computing devices connected to the cloud system, such as a user's computing device. The files may be scattered over nodes all throughout the network. Sometimes the process or device requesting the operation may be located far away on the network from the node storing the file.

According to an embodiment, a system may determine a new file allocation for files stored in a file storage network. The new file allocation may also be called a file placement scheme. The file placement scheme can minimize the costs associated with file operations requested by faraway network nodes or computing devices. This can be accomplished by monitoring the usage regularity, access patterns (both current and historical), network location of requesting nodes relative to the node storing the file, and the like, for files stored in the network. A more efficient file allocation may be determined based on this information and presented to a user. The user may provide an instruction to the system to implement the new file allocation. The system may be advantageous because it can determine a more efficient file allocation based on actual network conditions and usage of the file. In addition, the system can optimize the file allocation repeatedly over a period of time as the network topology changes (e.g., as nodes are added or removed, as virtual machines are migrated to different nodes). This can achieve more balanced file system utilization and reduce network overhead (e.g., usage of network bandwidth), which can improve resource elasticity in a cloud system. Further details of this embodiment and associated advantages, as well as of other embodiments, will be discussed in more detail below with reference to the drawings.

Figure 1:
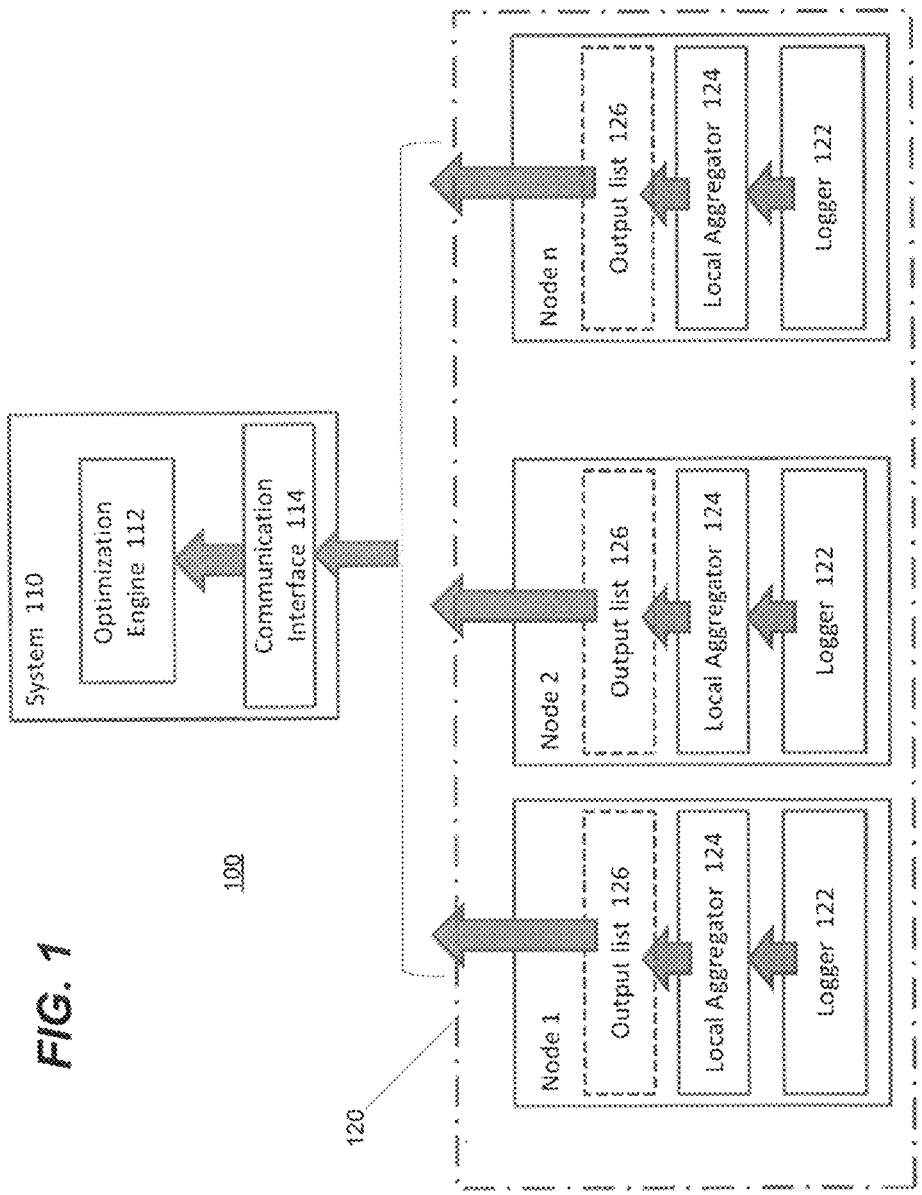
FIG. 1 illustrates a system for optimizing a file storage system, according to an example.

Referring now to the drawings, FIG. 1 illustrates a system for optimizing a file storage network, according to an example. Cloud system 100 may include a system 110 and a file storage system 120. System 110 can be any of various computers, such as a server computer, workstation computer, desktop computer, or the like. Additionally, system 110 can comprise multiple computers linked together via network connections to accomplish the functionality associated with system 110. System 110 can be used to manage file storage system 120, as described in detail below.

System 110 may be in communication with file storage system 120. File storage system 120 may be a large-scale distributed file system (DFS), such as may be used in a cloud system. File storage system 120 may include multiple nodes, such as Node 1 and Node 2 through Node n, where n can be any number. Nodes 1-n may be a cloud system comprising various computing devices used in a networked configuration. Each node may be a computer and may comprise any device capable of processing instructions and transmitting data to and from other computers, such as a laptop computer, a desktop computer, a workstation computer, a server computer, a single blade of a server computer, a tablet computer, a smart phone, or the like.

The nodes of file storage system 120 may be interconnected via a network, which may be a local area network, wide area network, the Internet, or the like. The network and intervening nodes may use various protocols including virtual private networks, local Ethernet networks, private networks using communication protocols proprietary to one or more companies, cellular and wireless networks, instant messaging, HTTP and SMTP, and various combinations of the above.

Each node of file storage system 120 may store one or more files. The stored files may be system and operational files required by the node for operation, including an operating system, utilities, and the like. However, the stored files may also be files stored for the benefit of users of the cloud system 100. For example, the stored files may include personal files, work files, and the like, that the user has stored on cloud system 100. Each node of file storage system 120 may also host one or more applications or processes. For example, each node may host one or more virtual machines. These virtual machines may be used by users of the cloud system 100.

The files stored on file storage system 120 may be operated on for various reasons. Example file operations are accessing a file, transferring a file, and modifying a file. In some cases, the node storing the file may request that operations be performed on the file for basic file management reasons. However, users may also request that operations be performed on the stored files. There can be at least two types of user requests for a file. First, the user may connect to cloud system 100 via the Internet or another network using a personal computing device and may directly request that operations be performed on the files. Second, a user may similarly connect to cloud system 100 via the Internet or another network using a personal computing device, but may request the creation of a virtual machine on one of the nodes so that the user can use the computer processing resources of the cloud system 100. Through the virtual machine, the user may request that various operations be performed on the files.

Each of the nodes in the file storage system 120 may keep a log of file operations performed on the files stored at the node. Each node can include a logger 122 to track operations performed on the files. For example, logger 122 can record every operation performed on a file, such as creation, access, modification, transfer, and deletion. These logs may thus provide a file operation history for each file stored on the node. Logger 122 can interface with the operating system executed by the node to monitor operations performed on files stored in the node. In addition, logger 122 may interface with other programs running on the node that handle requests from other nodes in file storage system 120 to determine the identity of requesting nodes. Accordingly, logger 122 can record whether the operation was requested locally by the node itself or whether it was requested by another node or other device on the network. Logger 122 can record identifying information of the network node, of the virtual machine requesting the operation, or of the computer device. Logger 122 may also record the length of time that the operation took place and may separately record repeated operations. Logger 122 may generate one or more logs including operations and associated information for each file stored on the node. These logs, when viewed collectively, may enable analysis of the file storage system 120. For example, network load, time windows of high usage, and usage loads of each node may be determined by examining the logs.

Logger 122 may also record similar information for virtual machines running on the node. For example, logger 122 may record all file operations requested by a virtual machine executed by the node on which logger 122 is executed. Information about virtual machines and requested operations may be recorded to provide duplication of recorded information. This information may also be recorded to deal with situations where there may be multiple virtual machines communicating with each other. For example, one virtual machine may request the creation of another virtual machine through which it may make file operation requests. Accordingly, the file operation in that case may be associated with both virtual machines, which may be on different network nodes, so as to provide full information regarding the network load created by the file operation.

Logs generated by logger 122 may be passed to a local aggregator 124 on the same node. Local aggregator 124 may process the logs to prepare them for transmission to system 110. In one example, local aggregator 124 may consolidate sequential local file operations into a single entry on the logs. A local file operation is an operation that was requested by the node storing the file. In contrast, a network file operation is an operation that was requested by a node different from the one storing the file. Thus, for example, if the log indicates that the node storing the file performed five local operations on the file in a sequential manner—uninterrupted by a network operation—then those five local operations can be consolidated into a single entry. This can be done to minimize the amount of data (e.g., the identity of the accessing node) that will be sent to system 110. However, the number of accesses made may be preserved in the single entry so that system 110 knows that five local operations were performed sequentially. Local aggregator 124 may generate an output list 126 having the consolidated entries to be sent to system 110. In some examples, however, the logs generated by the logger 124 may be transmitted to system 110.

System 110 may include a communication interface 114. Communication interface 114 may include a network interface to interface with the Internet or some other network so as to connect system 110 to file storage system 120. Communication interface 114 may receive one or more logs from each node of file storage system 120. For example, communication interface 114 may receive the output lists 126 generated by the local aggregator 124 of each node. System 110 may aggregate all operations for each file, in the case where multiple logs have information regarding operations for a given file.

System 110 may include an optimization engine 112. The optimization engine 112 may comprise hardware, firmware, and/or software, which may be machine-readable instructions, executable by a processor on system 110. Optimization engine 112 may be configured to determine a new allocation of the files stored in the file storage system 120. The new allocation may be a new file placement scheme for storing the files across the nodes in the file storage system 120. The new allocation may be determined by examining the output lists 126 and determining a file placement scheme that would reduce network traffic caused by the operations performed on the files. In some examples, a new allocation that would reduce network traffic caused by the operations performed on the files may be considered a more efficient file allocation.

Optimization engine 112 may determine a new file placement among the nodes by analyzing the output lists 126 and considering the following factors: (1) the nodes that request operations on the files and whether they are accessing the files locally or through the network; (2) how frequently the nodes access the files; (3) the access duration and access patterns of the file (e.g., whether the file is accessed regularly over time or in short bursts in a specific time period); and (4) the topology of the file storage system 120.

Information for factors 1-3 may be gathered from the output lists 126. The file operations may be assigned weights with respect to their contribution towards the overall network load. For example, a fixed weight may be assigned to local operations (i.e., operations requested by the node storing the file). A variable weight may be assigned to network operations (i.e., operations requested by a node different from the node storing the file). The variable weight may be proportional to the distance between the requesting node and the node storing the file. These weights for individual operations may be put through a cost function to determine the cost incurred in accessing these files by the respective nodes. For example, the weights for all individual operations for a node may be added together to yield a total file operation cost for each file. Information regarding the network topology for factor 4 may be collected when the network is being set up.

Optimization engine 112 thus may attempt to compute the optimal file allocation strategy based on this information. In determining a new file allocation, the optimization engine 112 may attempt to minimize the network distance between the nodes that frequently access the files and the files themselves (e.g., by placing the files nearer to where they are frequently accessed from). Thus, the optimization engine 112 can compare the current total file operation cost for each file and determine whether that cost could be reduced by moving the file to another node in the file storage network 120. By doing this for each file stored in each node in file storage network 120, the overall file operation cost (and network overhead) can be reduced. The optimization engine 112 may also attempt to balance out the load on each node by balancing the number of highly accessed files and the number of rarely accessed files on each node. This can reduce the overhead on each individual node, which can improve overall processing speed and balance over the entire file storage system 120.

Figure 2:
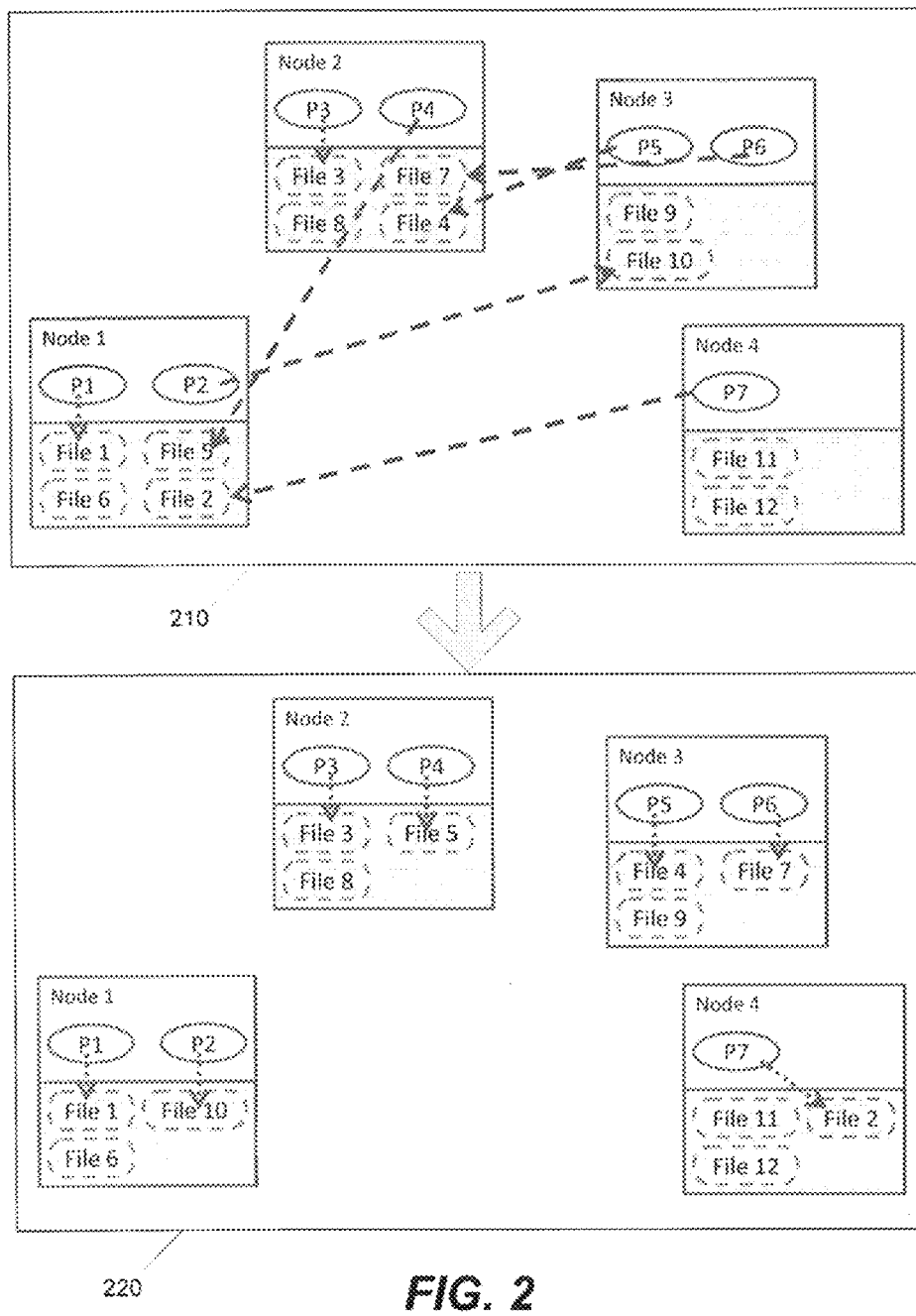
FIG. 2 illustrates a file storage system before and after optimization, according to an example.

FIG. 2 illustrates a file storage system before and after optimization, according to an example. Block 210 illustrates an example of a network-connected file storage system before optimization. The file storage system may be similar to file storage system 120 of FIG. 1.

Each node of the file storage system shown in block 210 may store one or more files and host one or more processes. For example, Node 1 stores the following files: File 1, File 2, File 5, and File 6. Node 1 also hosts two processes: P1 and P2. In one example, P1 and P2 are virtual machines. The arrow pointing from P1 to File 1 is intended to illustrate that P1 has requested an operation for File 1. This is an example of a local file operation. The arrow from P2 to File 10 in Node 3 is intended to illustrate that P2 has requested an operation for File 10. This is an example of a network file operation. The other arrows may be interpreted in a similar fashion. As can be seen, there are 5 network operations depicted in 210. These 5 network operations create a certain amount of network overhead since some of the network's bandwidth is used to accommodate the file operations. In contrast, the local file operations do not create network overhead since the node hosting the file and the process may accommodate the operation without communicating over the network.

Block 220 illustrates an example of the file storage system depicted in block 210 after optimization. For example, the system 110 described in FIG. 1 may be used to generate a new file allocation, which may result in a rearrangement of the file storage system as shown in block 220. As can be seen, all network file operations have been eliminated by moving the files to reduce network overhead. For instance, Node 1 now stores File 10, which used to be stored on Node 3. However, Node 1 still stores File 1 to accommodate P1's file operation request. Node 1 no longer stores File 2, which now resides on Node 4 to eliminate the network overhead caused by P7's file operation request. Accordingly, a more efficient file allocation may be achieved by using the system described in FIG. 1. Note, however, that FIG. 2 illustrates a simplified example. In most real-world situations, it is unlikely that all network overhead can be eliminated using the techniques described herein. Rather, network overhead may generally be reduced. Additionally, this example deals only with file operations requested by processes running on nodes in the network. However, users may also request operations from their personal computing devices and these types of requests may also be taken into account when optimizing a file storage system.

In some examples, the load on each node may be uneven. For instance, one node may have files that are operated on very frequently while another node may have files that are operated on very infrequently. In such a case, the system can determine a file allocation that attempts to balance the load on the nodes in addition to decreasing network costs. Thus, files that are frequently accessed may in some cases be moved from a node storing other frequently accessed files to a node that primarily stores infrequently accessed files.

Figure 3:
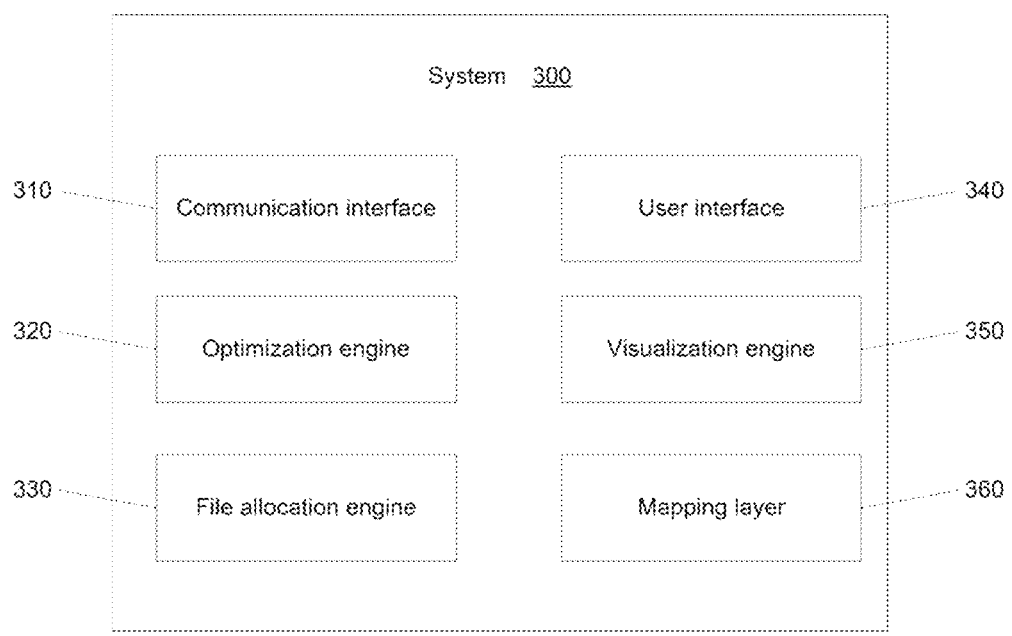
FIG. 3 illustrates a system for optimizing a file storage system, according to an example.

FIG. 3 illustrates a system for optimizing a file storage network, according to an example. System 300 may include a communication interface 310 and optimization engine 320, which may be substantially as described in FIG. 1. System 300 may also include a file allocation engine 330, a user interface 340, a visualization engine 350, and a mapping layer 360. System 300 may be in communication with a file storage system, such as file storage system 120.

File allocation engine 330 may reallocate the files in the file storage system according to the new allocation determined by the optimization engine 320. The reallocation may be performed automatically. For example, the file allocation engine 330 can be configured to reallocate the files if a certain threshold of network overhead savings can be attained by reallocating the files according to the new file allocation. Alternatively, the reallocation can be triggered manually. For example, an administrator or other user could provide an instruction to the file allocation engine 330 to reallocate the files.

The instruction to the file allocation engine 330 could be provided via user interface 340. User interface 340 may include one or more input devices (e.g., keyboard, mouse, touch pad, microphone), one or more output devices (e.g., display, touch-sensitive display, speakers), and machine-readable instructions providing the software component of the user interface. In some examples, user interface may be located remotely from system 300 on another computing device.

Visualization engine 350 may generate a visual representation of the new allocation of the files. The visual representation may then be displayed to the administrator or user via user interface 350 to assist them in deciding whether to accept the new allocation. In some examples, a visual representation of the current file allocation may also be displayed via user interface 350 so that the administrator/user may compare the proposed allocation with the current allocation. An example visual representation is illustrated in FIG. 2.

Mapping layer 360 may maintain a mapping between the new allocation of the files (if the new file allocation is implemented) and previous allocations of the files. In one example, mapping layer 360 may do this by storing a table that includes an entry for each file stored in the file storage system along with information regarding one or more nodes that the file was previously stored on and information regarding the current node that the file is stored on. Mapping layer 360 may update this table each time the storage location of one or more files is changed. Thus, a persistent file path may exist for the nodes in the file storage system. The mapping layer 360 may be implemented by multiple computers that interface with the file storage system so that system 300 is not overloaded by requests for translation of file paths.

Figure 4:
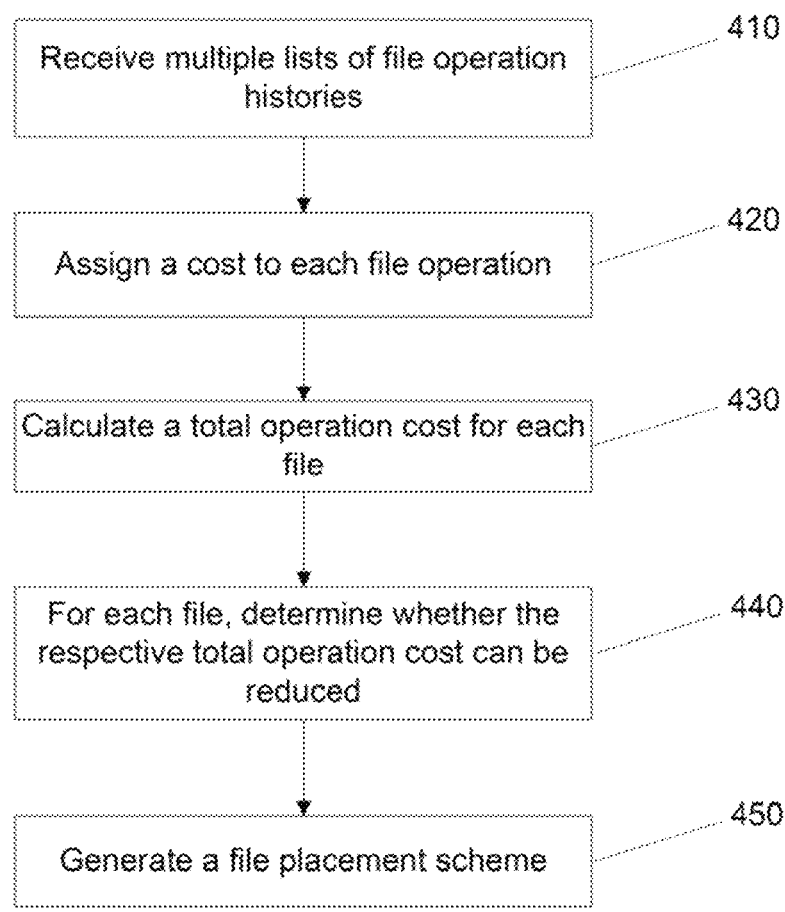
FIG. 4 illustrates a process for optimizing a file storage system, according to an example.

FIG. 4 illustrates a method for optimizing a file storage network, according to an example. Although execution of method 400 is described below with reference to the components of system 300, other suitable components for execution of method 400 can be used. Method 400 may be implemented in the form of executable instructions stored on a machine-readable medium or in the form of electronic circuitry. A processor, a machine-readable storage medium, other control logic, or a combination thereof can be used to execute method 400.

Method 400 may start at 410 where multiple lists of file operation histories may be received. The file operations histories may list operations performed on files stored on nodes in a file storage system. The lists may be received by communication interface 310 of system 300. The lists may be received from nodes in a file storage system 120.

At 420, a cost may be assigned to each file operation in the lists. The cost may be determined based on whether the file operation was a local operation or a network operation. In one example, the cost may be a low fixed cost for local operations and a variable cost for network operations based on the distance between the requesting node and the node storing the file. At 430, a total operation cost for each file may be determined. For instance, the cost of all operations for a given file may be added together, input into a cost function, or the like, to determine the total operation cost for each file.

At 440, the information for each file may be examined to determine whether the total operation cost may be reduced. For example, the total operation cost may be reduced by moving the file to another node in the file storage system. Accordingly, optimization engine 320 may calculate what the total operation cost would be if the file were moved to different nodes in the file storage system. In some examples, not all nodes are considered when making this determination. For example, the determination may by examining just the nodes that have requested that operations be performed on the file and/or nodes that are located closer to a group of requesting nodes. At 450, a file placement scheme may be generated that reduces an overall file operation cost (e.g., network load). The file placement scheme may reduce the overall file operation cost by virtue of reducing one or more total operation costs for individual files stored in the file storage system.

In some examples, the multiple lists of file operations may relate to file operations that occurred during a first period of time. During generation of a file placement scheme, file operations that occurred during a prior period of time may also be considered. This can be useful so that file operations during a first period of time that are anomalies (e.g., they don't tend to occur when considering a greater period of time) do not unduly influence a proposed file placement scheme.

In some examples, a graphical representation of the file placement scheme may be generated for presentation to a user. For instance, visualization engine 350 may generate the graphical representation, and it may be presented to the user via user interface 340.

Figure 5:
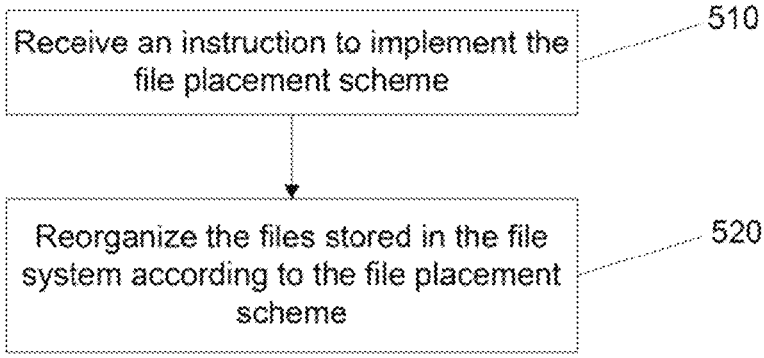
FIG. 5 illustrates a process for rearranging files stored on a file storage system based on a user's instruction, according to an example.

FIG. 5 illustrates a method 500 for rearranging a file storage network based on a user's instruction, according to an example. At 510, an instruction can be received to implement the file placement scheme. For example, the instruction may be received via user interface 340. At 520, the files stored in the file storage system can be reorganized in accordance with the file placement scheme. For example, file allocation engine 330 may reallocate the files according to the file placement scheme.

Figure 6:
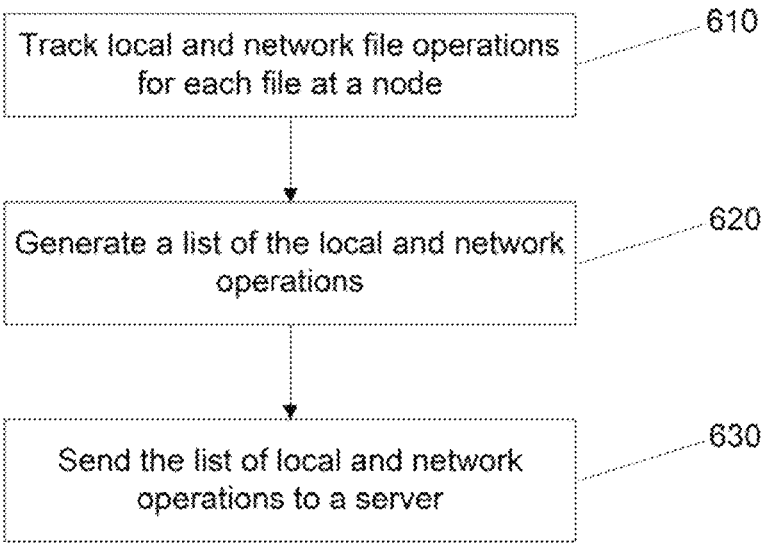
FIG. 6 illustrates a process for tracking file operations at a node in a file storage system, according to an example.

FIG. 6 illustrates a method 600 for tracking file operations at a node in a file storage system, according to an example. At 610, local and network operations can be tracked for each file at a node in the file storage system. For example, logger 122 can track the local and network file operations. At 620, a list of the local and network file operations may be generated. For example, logger 122 can generate logs based on the tracked operations and local aggregator 124 can generate lists based on these logs. At 630, the lists of local and network operations may be sent to a server. For example, the lists may be sent to system 110 or 300 by each node in the file storage system.

Figure 7:
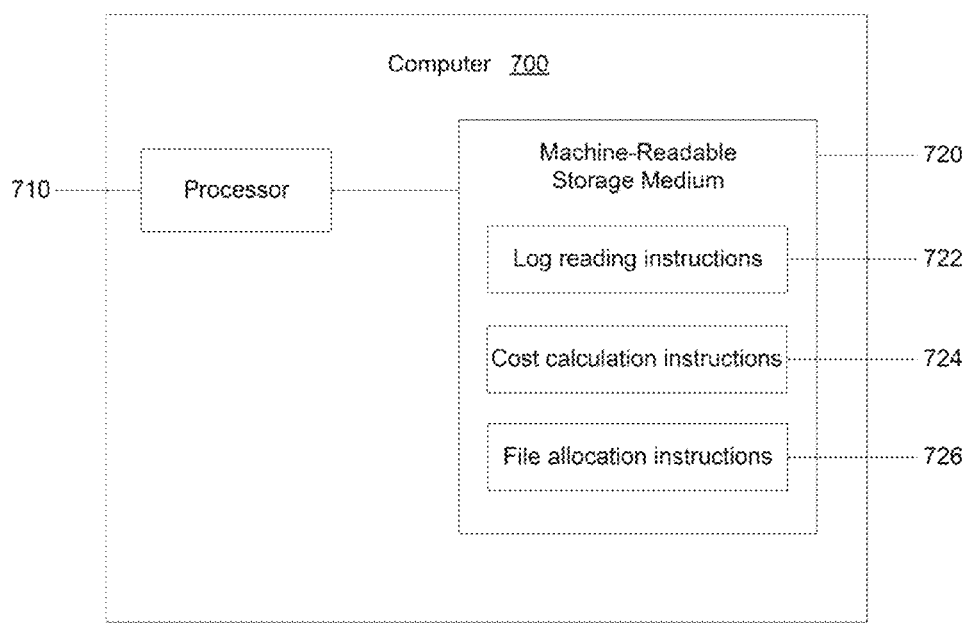
FIG. 7 illustrates a computer-readable medium to determine a more efficient file allocation for a file storage system, according to an example.

FIG. 7 is a block diagram illustrating aspects of a computer 700 including a machine-readable storage medium 720 encoded with instructions, according to an example. Computer 700 may be any of a variety of computing devices, such as a workstation computer, a desktop computer, a laptop computer, a tablet or slate computer, a server computer, or a smart phone, among others.

Processor 710 may be at least one central processing unit (CPU), at least one semiconductor-based microprocessor, other hardware devices or processing elements suitable to retrieve and execute instructions stored in machine-readable storage medium 720, or combinations thereof. Processor 710 can include single or multiple cores on a chip, multiple cores across multiple chips, multiple cores across multiple devices, or combinations thereof. Processor 710 may fetch, decode, and execute instructions 722, 724, 726, among others, to implement various processing. As an alternative or in addition to retrieving and executing instructions, processor 710 may include at least one integrated circuit (IC), other control logic, other electronic circuits, or combinations thereof that include a number of electronic components for performing the functionality of instructions 722, 724, 726. Accordingly, processor 710 may be implemented across multiple processing units and instructions 722, 724, 726 may be implemented by different processing units in different areas of computer 700.

Machine-readable storage medium 720 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 720 can be computer-readable and non-transitory. Machine-readable storage medium 720 may be encoded with a series of executable instructions for managing processing elements.

The instructions 722, 724, 726, when executed by processor 710 (e.g., via one processing element or multiple processing elements of the processor) can cause processor 710 to perform processes, for example, the processes depicted in FIGS. 4-6. Furthermore, computer 700 may be similar to system 110 or 300 and may have similar functionality and be used in similar ways, as described above.

Log reading instructions 722 can cause processor 710 to read multiple node operation logs associated with multiple nodes of a cloud storage system. The cloud storage system may be a system like file storage network 120. The Node operation logs may include file operation histories, as generated by logger 122 and local aggregator 124. Cost calculation instructions 724 can cause processor 710 to calculate an operation cost for each file based on which nodes in a cloud network requested the operations. The cloud network may be a cloud system, such as cloud system 100, that includes the cloud storage system. The operation costs may be proportional to a distance traveled between the node storing the file and the node requesting the operation. Thus, local operations may have a low fixed cost while network costs may have a higher variable cost. File allocation instructions 726 may determine a more efficient file allocation for the cloud storage system. The new file allocation may be determined by reducing the operation cost for one or more files.

What is claimed is:

1. A system, comprising:
a communication interface to receive logs from a plurality of nodes that store files in a cloud storage system, each of the logs indicating a file operation history for a respective file stored on a respective node of the plurality of nodes, the file operation history indicating operations performed on the respective file and which nodes requested the operations; and
an optimization engine including at least one processor to determine, based on the file operation histories indicated by the logs, a new allocation of the files across the nodes of the cloud storage system to reduce network traffic caused by operations performed on the files, wherein the determining of the new allocation of the files comprises, for each given file of the files:
assigning first weights to respective local operations in which the given file requested by a requesting node is stored at the requesting node;
assigning variable weights to respective network operations in which the given file requested by the requesting node is stored at another node;
aggregating the first weights and the variable weights to produce a total operation cost for operations on the given file; and use the total operation cost to determine the new allocation of the files.

2. The system of claim 1, further comprising a file allocation engine to reallocate the files in the cloud storage system according to the new allocation determined by the optimization engine.

3. The system of claim 1, wherein sequential local operations are indicated as a single operation in the file operation history for the respective file.

4. The system of claim 1, further comprising a mapping layer to maintain a mapping between the new allocation of the files and previous allocations of the files so as to provide a persistent file path to the files for nodes requesting operations for the files based on a previous allocation.

5. A system comprising:
a communication interface to receive logs from a plurality of nodes that store files in a cloud storage system, each of the logs indicating a file operation history for a respective file stored on a respective node of the plurality of nodes, the file operation history indicating operations performed on the respective file and which nodes requested the operations, wherein for a given file, a local operation is an operation performed on the given file by a node storing the file, and a network operation is an operation performed on the given file by a node different from the node storing the file; and
an optimization engine including at least one processor to determine a new allocation of the files across the nodes of the cloud storage system to reduce network traffic caused by operations performed on the files, wherein the optimization engine is configured to determine the new allocation of the files by, for each file:
assigning a fixed weight to each of local operations;
assigning a variable weight to each of network operations based on distance traveled from a node requesting an operation to a node storing the file;
calculating a total file operation cost by a cost function based on the fixed weights and the variable weights;
determining whether storing the file on another node in the cloud storage system will reduce the total file operation cost given the file operation history of the file; and
selecting a node that would provide a lower total file operation cost.

6. The system of claim 1, wherein the file operation history for the respective file indicates a length of time that each operation performed on the respective file lasted, and the optimization engine is configured to consider the length of time of each operation when determining the new allocation.

7. The system of claim 1, further comprising a visualization engine to generate a visual representation of the new allocation of the files.

8. The system of claim 5, wherein the cost function calculates the total file operation cost by summing the fixed weights and the variable weights.

9. A method, comprising:
receiving, using a processor, multiple lists of file operations for files stored on nodes in a distributed file system;
assigning, using a processor, a cost to each file operation based on whether the file operation is a local operation or a network operation, wherein the local operation is an operation on a given file of the files in which the given file is stored on a node that requested the given file, and wherein the network operation is an operation on the given file in which the given file is stored on a node different from the node that requested the given file, and wherein the cost assigned to the local operation is a fixed cost, and the cost assigned to the network operation is a variable cost dependent on a distance between a node storing the given file and the node that requested the given file;
calculating, using a processor, a total operation cost for each respective file of the files by adding together the costs of local operations and the costs of network operations for the respective file; and
for each respective file of the files, determining, using a processor, whether the respective total operation cost can be reduced by storing the respective file on another node in the distributed file system.

10. The method of claim 9, further comprising generating a file placement scheme that reduces an overall file operation cost by reducing one or more total operation costs of files stored in the distributed file system.

11. The method of claim 10, further comprising generating a graphical representation of the file placement scheme for presentation to a user.

12. The method of claim 11, further comprising:
receiving an instruction from the user to implement the file placement scheme; and
reorganizing the files stored in the distributed file system according to the file placement scheme.

13. The method of claim 10,
wherein the multiple lists of file operations relate to file operations that occurred during a first period of time, and
wherein generating the file placement scheme that reduces the overall file operation cost takes into account file operations that occurred during a second period of time that occurred prior to the first period of time.

14. The method of claim 9, further comprising:
at each respective node in the distributed filing system,
tracking local operations for files stored on the respective node and network operations for files stored on the respective node;
generating a list of the local and network operations; and
sending the list of the local and network operations to a server,
wherein the multiple lists of file operations comprise the list of the local and network operations generated by each respective node in the distributed file system.

15. A non-transitory machine-readable storage medium encoded with instructions executable by at least one processor to:
read node operation logs associated with multiple nodes of a cloud storage system, each node operation log indicating a file operation history for each file stored on a node of the multiple nodes;
calculate an operation cost for a respective file of a plurality of files, wherein the calculating comprises:
aggregating costs of local file operations for the respective file and costs of network file operations for the respective file, wherein a local file operation is an operation requested by a node that stores the respective file, and a network file operation is an operation requested by a node different from the node that stores the respective file, and wherein each of the costs of local file operations is a fixed cost, and each of the costs of network file operations is a variable cost dependent on a distance between the node that stores the respective file and the node that requested the network file operation; and
determine a different file allocation in the cloud storage system to reduce an operation cost for at least one of the plurality of files.

16. The non-transitory machine-readable storage medium of claim 15, wherein the file operation history for each respective file further identifies nodes performing operations on the respective file.

17. The non-transitory machine-readable storage medium of claim 16, wherein the file operation history for each respective file further identifies time durations of corresponding operations on the respective file.

* * * * *